(12) United States Patent
Jung et al.

(10) Patent No.: US 10,468,752 B2
(45) Date of Patent: Nov. 5, 2019

(54) WIRELESS COMMUNICATION MODULE AND PORTABLE TERMINAL INCLUDING THE SAME

(71) Applicant: SAMSUNG ELECTRONICS CO., LTD., Suwon-si, Gyeonggi-Do (KR)

(72) Inventors: Ho-Jin Jung, Yongin-si (KR); Hyoung-Hwan Roh, Seoul (KR); Young-Jae Jang, Seoul (KR); Il-Jong Song, Suwon-si (KR)

(73) Assignee: SAMSUNG ELECTRONICS CO., LTD., Suwon-si, Gyeonggi-Do (KR)

( * ) Notice: Subject to any disclaimer, the term of this patent is extended or adjusted under 35 U.S.C. 154(b) by 311 days.

(21) Appl. No.: 15/182,792

(22) Filed: Jun. 15, 2016

(65) Prior Publication Data

US 2016/0372837 A1 Dec. 22, 2016

(30) Foreign Application Priority Data

Jun. 16, 2015 (KR) .................. 10-2015-0085148

(51) Int. Cl.
*H01Q 1/24* (2006.01)
*H04B 5/00* (2006.01)
*H04W 4/80* (2018.01)
*H01Q 1/40* (2006.01)
*H01Q 1/44* (2006.01)
*H01Q 7/00* (2006.01)
*H01Q 21/28* (2006.01)

(52) U.S. Cl.
CPC .............. *H01Q 1/243* (2013.01); *H01Q 1/40* (2013.01); *H01Q 1/44* (2013.01); *H01Q 7/00* (2013.01); *H01Q 21/28* (2013.01); *H04B 5/0031* (2013.01); *H04W 4/80* (2018.02)

(58) Field of Classification Search
CPC ............ H01Q 1/243; H01Q 1/40; H01Q 1/44; H01Q 7/00; H01Q 17/004; H01Q 21/28; H01Q 7/08
See application file for complete search history.

(56) References Cited

U.S. PATENT DOCUMENTS

| 2007/0024509 | A1 | 2/2007 | Lee | |
|---|---|---|---|---|
| 2007/0176831 | A1* | 8/2007 | Lagnado | ............... G06F 1/1616 343/702 |
| 2010/0084473 | A1 | 4/2010 | Choi | |
| 2012/0319911 | A1* | 12/2012 | Chou | ....................... H01Q 1/36 343/787 |

(Continued)

FOREIGN PATENT DOCUMENTS

| EP | 2648274 A1 * | 10/2013 | ........... H04B 1/3833 |
|---|---|---|---|
| JP | 2007-226736 | 9/2007 | |

(Continued)

*Primary Examiner* — Hoang V Nguyen
(74) *Attorney, Agent, or Firm* — F. Chau & Associates, LLC

(57) ABSTRACT

A wireless communication module includes a controller configured to control wireless communication operations, an antenna module that includes a first antenna device, and a matching circuit configured to perform impedance matching between the controller and the antenna module, wherein the first antenna device includes a heat dissipating sheet with a first pattern that transceives wireless signals by detecting a surrounding magnetic flux.

20 Claims, 15 Drawing Sheets

(56) References Cited

U.S. PATENT DOCUMENTS

| | | | | |
|---|---|---|---|---|
| 2013/0225070 | A1* | 8/2013 | Lin | H04B 5/0056 455/41.1 |
| 2013/0234658 | A1* | 9/2013 | Endo | H02J 7/025 320/108 |
| 2013/0244577 | A1* | 9/2013 | Cheikh | G07C 9/00309 455/41.1 |
| 2013/0267170 | A1 | 10/2013 | Chong et al. | |
| 2014/0009362 | A1* | 1/2014 | Ho | H04B 1/04 343/861 |
| 2014/0045425 | A1* | 2/2014 | Roh | H04B 5/0012 455/41.1 |
| 2014/0240179 | A1* | 8/2014 | Kim | H01P 11/001 343/702 |
| 2014/0312123 | A1* | 10/2014 | Lin | G06K 19/07754 235/492 |
| 2015/0009077 | A1 | 1/2015 | Lee et al. | |
| 2015/0123860 | A1* | 5/2015 | Park | H01Q 1/526 343/720 |
| 2015/0145730 | A1* | 5/2015 | Pegg | H04M 1/026 343/702 |

FOREIGN PATENT DOCUMENTS

| | | |
|---|---|---|
| JP | 2010-102610 | 5/2010 |
| JP | 2012-168917 | 9/2012 |
| KR | 1020140048811 | 4/2014 |
| KR | 1020140089962 | 7/2014 |
| KR | 101443277 | 9/2014 |
| KR | 1020140132515 | 11/2014 |

* cited by examiner

WIRELESS COMMUNICATION MODULE AND PORTABLE TERMINAL INCLUDING THE SAME

CROSS-REFERENCE TO RELATED APPLICATION

This application claims priority under 35 U.S.C. § 119 from, and the benefit of, Korean Patent Application No. 10-2015-0085148, filed on Jun. 16, 2015 in the Korean Intellectual Property Office, the contents of which are herein incorporated by reference in their entirety.

BACKGROUND

Embodiments of the inventive concept are directed to a wireless communication module and a portable terminal including the same, and more particularly, to a wireless communication module and a portable terminal including the same for improving heat dissipation efficiency and wireless communication quality.

In general, a portable terminal has a detachable cover on a bottom thereof, and a battery pack can be recharged after separating the cover from the portable terminal. Since a user's hand directly touches the cover of the portable terminal, the user can directly feel heat from the portable terminal. Therefore, gripping the portable terminal with a hand may be dangerous if the temperature of the portable terminal becomes higher than that of a human body.

A portable terminal may wirelessly perform bidirectional communication at close ranges through an installed near field communication (NFC) antenna. The NFC antenna has been gradually adopted and used with portable terminals and in various fields due to having a short communication setting time and fewer detection malfunctions as compared to other existing methods, such as Bluetooth® or ZigBee, even though the NFC antenna has a low data transmission speed. Portable terminals that include an NFC antenna have been used with smart cards such as electronic cash, electronic wallets, electronic ticketing, a door keys, or ID cards, and makes it possible to share or exchange a business card, a telephone number, a photo, or music with friends.

SUMMARY

Embodiments of the inventive concept can provide a wireless communication module and a portable terminal including the same, and more particularly, a wireless communication module and a portable terminal including the same for improved heat dissipation efficiency and wireless communication quality.

According to an embodiment of the inventive concept, there is provided a wireless communication module that includes a controller configured to control wireless communication operations, an antenna module that includes a first antenna device, and a matching circuit configured to perform impedance matching between the controller and the antenna module, in which the first antenna device includes a heat dissipating sheet with a first pattern that can detect a surrounding magnetic flux and transceive a wireless signal.

In further embodiments, the heat dissipating sheet includes at least one of natural graphite particles, compressed exfoliated graphite particles, copper, graphene particles, carbon nanotubes (CNT), and a graphene hybrid.

In further embodiments, the heat dissipating sheet includes a near field communication (NFC) antenna, and the controller includes an NFC chip that controls near field communication.

In further embodiments, the first antenna device includes a magnetic sheet stacked on an upper surface of the heat dissipating sheet and that covers the first pattern included in the heat dissipating sheet.

In further embodiments, the heat dissipating sheet includes a second pattern, and pattern width of the first pattern is narrower than that of the second pattern.

In further embodiments, the antenna module includes a second antenna device, and the second antenna device includes a flexible printed circuit board (FPCB) and a pattern in the FPCB and configured to transceive a wireless signal and detect a surrounding magnetic flux.

According to another embodiment of the inventive concept, there is provided a portable terminal including a cover, and an antenna device mounted on an inner surface of the cover, in which the antenna device includes a heat dissipating sheet that emits heat to a lower temperature region wherein the heat dissipating sheet includes a pattern that detects a surrounding magnetic flux and transceives a wireless signal, and a magnetic sheet stacked on one surface of the heat dissipating sheet and that covers a pattern in the heat dissipating sheet.

In further embodiments, the portable terminal further includes an FPCB on which a plurality of semiconductor chips are mounted, a connection terminal connected to at least one of one end and an other end of the pattern on the heat dissipating sheet, and a main body terminal connected to the FPCB, in which the connection terminal is connected to the main body terminal.

In further embodiments, the pattern formed in the heat dissipating sheet includes first and second patterns, and pattern intervals of the first and second patterns differ from each other.

According to another embodiment of the inventive concept, there is provided a A wireless communication module that includes an antenna module that includes a first antenna device, wherein the first antenna device includes a heat dissipating sheet and a magnetic sheet stacked on an upper surface of the heat dissipating sheet, in which the heat dissipating sheet includes a first pattern for transceiving wireless signals by detecting a surrounding magnetic flux, and magnetic sheet covers the first pattern in the heat dissipating sheet, the heat dissipating sheet comprises at least one of natural graphite particles, compressed exfoliated graphite particles, copper, graphene particles, carbon nanotubes (CNT), and a graphene hybrid, and the magnetic sheet comprises a ferrite sheet.

In further embodiments, the wireless communication module includes a controller configured to control wireless communication operations; and a matching circuit configured to perform impedance matching between the controller and the antenna module.

DETAILED DESCRIPTION OF EXEMPLARY EMBODIMENTS

Figure 1:
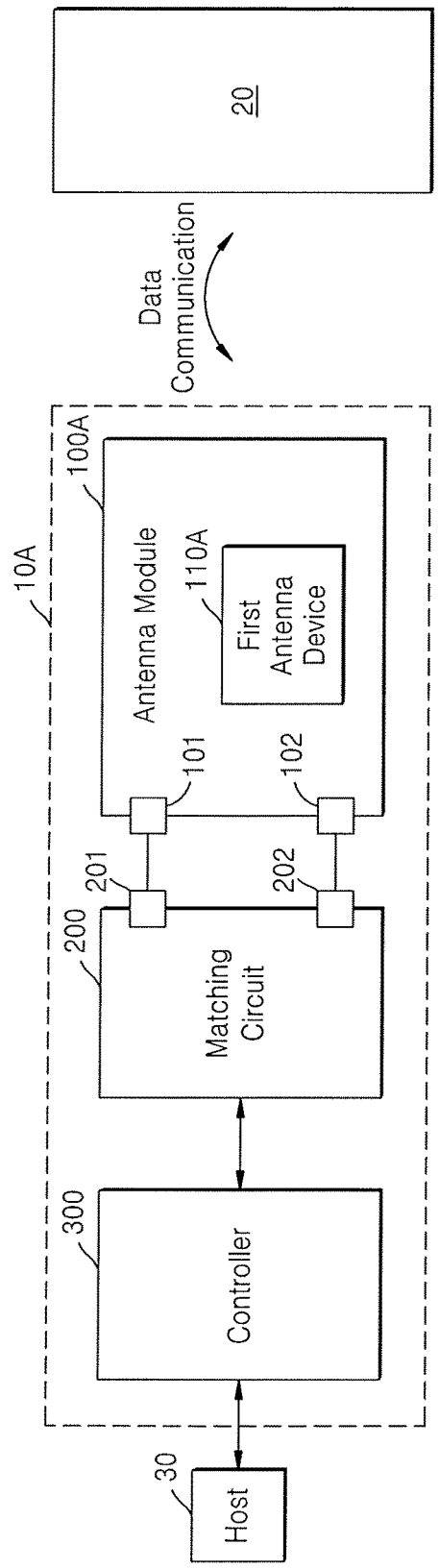
FIG. 1 is a block diagram of a wireless communication module according to an exemplary embodiment of the inventive concept.

Embodiments of the present inventive concept will now be described more fully hereinafter with reference to the accompanying drawings, in which exemplary embodiments of the inventive concept are shown. These embodiments are provided so that this disclosure is thorough and complete and fully conveys the scope of the inventive concept to one skilled in the art. Accordingly, while the inventive concept can be modified in various ways and take on various alternative forms, specific embodiments thereof are shown in the drawings and described in detail below as examples. Like reference numerals may refer to like elements throughout. In the drawings, the thicknesses of layers and regions may be exaggerated for clarity.

FIG. 1 is a block diagram of a wireless communication module 10A according to an exemplary embodiment of the inventive concept.

Referring to FIG. 1, according to an embodiment, a wireless communication module 10A is a near field communication (NFC) module. The wireless communication module 10A can wirelessly transceive data with a communication device 20 and communicate with a host 30. The wireless communication module 10A can transmit a signal to the communication device 20 based on data received from the host 30 or can transmit data to the host 30 based on a signal received from the communication device 20. The host 30 may be a controller included in a communication device that includes a wireless communication module 10A, such as a general purpose processor, an application processor, or a system on chip (SOC). The host 30 can communicate with a communication device 20 that supports wireless communication through the wireless communication module 10A. The wireless communication module 10A and the host 30 may be included in a portable terminal such as a smart phone.

According to an exemplary embodiment of the inventive concept, the wireless communication module 10A includes an antenna module 100A, a matching circuit 200, and a controller 300. According to an exemplary embodiment, the antenna module 100A includes a first antenna device 110A that can generate a magnetic field based on a received signal or can generate a signal in response to an externally generated magnetic field. The first antenna device 110A includes a heat dissipating sheet that includes a pattern that can detect a surrounding magnetic flux and transceive a wireless signal. Furthermore, the heat dissipating sheet can absorb heat generated by the wireless communication module 10A, a device that includes the wireless communication module 10A, or a portable terminal, and can emit heat to a region with a lower temperature than the heat dissipating sheet. This will be described below in detail.

According to an embodiment, as illustrated in FIG. 1, the antenna module 100A includes first and second terminals 101 and 102. The antenna module 100A can be connected to the matching circuit 200 through the first and second terminals 101 and 102 and a signal received from the antenna module 100A or a signal due to a magnetic field transmitted to the antenna module 100A can be transmitted to the matching circuit 200 through the first and second terminals 101 and 102.

According to an embodiment, as illustrated in FIG. 1, the matching circuit 200 transceives a signal with the controller 300. Furthermore, the matching circuit 200 includes terminals 201 and 202 that are electrically connected to the first and second terminals 101 and 102 and can transceive a signal with the antenna module 100A. The matching circuit 200 includes at least one passive element, such as a resistor, a capacitor, or an inductor and can convert impedance between the controller 300 and the antenna module 100A. For example, the matching circuit 200 can be connected to the controller 300 through a plurality of conductor wires. The arrangement and characteristic values of passive elements, i.e., a capacitance, a resistance value, or an inductance, included in the matching circuit 200 can be determined so that a signal propagating through the first terminal 101 or the second terminal 102 may propagate through the conductor wires without distortion.

According to an embodiment, the controller 300 controls operation of the wireless communication module 10A and communicates with the external host 30. For example, the controller 300 can receive data from the host 30 by communicating with the host 30 and can output a signal to the matching circuit 200 generated by modulating the received data. Furthermore, the controller 300 can transmit data to the host 30 generated by demodulating a signal received through the matching circuit 200. The controller 300 can be implemented as a semiconductor device, and the semiconductor device may be a wireless communication chip, such as an NFC chip.

Although FIG. 1 illustrates an exemplary embodiment of the wireless communication module 10A communicating with the communication device 20, the wireless communication module 10A can support not only peer-to-peer communication (P2P) but also reader-tag communication and a card emulation operation, when the wireless communication module 10A corresponds to an NFC module. Therefore, the wireless communication module 10A according to an exemplary embodiment of the inventive concept can be used in an application that performs wireless communication with external devices other than the communication device 20, based on operations supported by an NFC module.

Figure 2A:
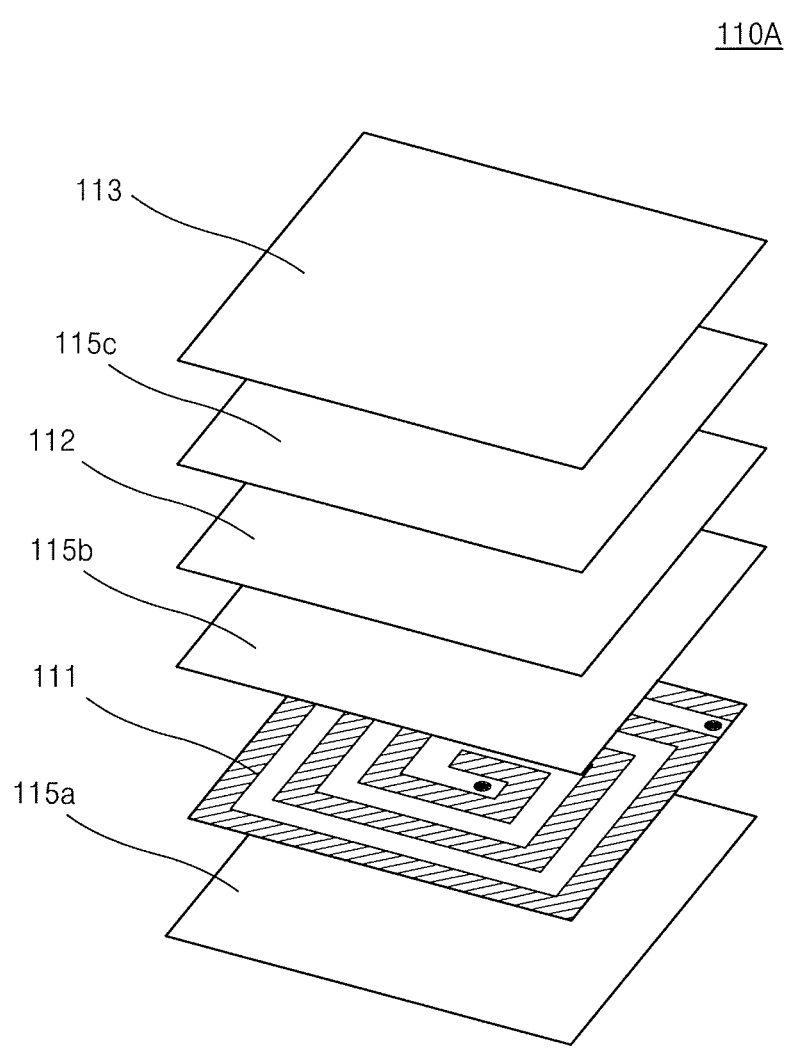
FIG. 2A is a perspective view of a disassembled first antenna device of FIG. 1 according to an exemplary embodiment of the inventive concept.
Figure 2B:
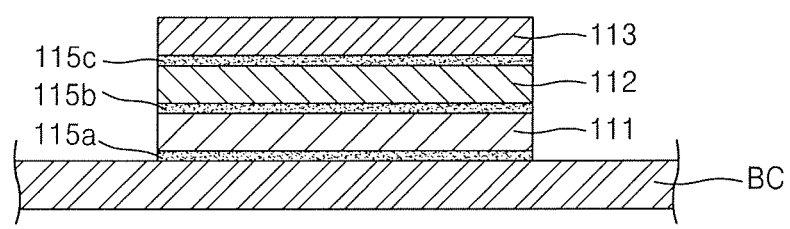
FIG. 2B is an enlarged sectional view of the first antenna device of FIG. 1.

FIG. 2A is a perspective view of a disassembled first antenna device 110A of FIG. 1 according to an exemplary embodiment of the inventive concept, and FIG. 2B is an enlarged sectional view of the first antenna device 110A of FIG. 1.

Referring to FIGS. 2A and 2B, the first antenna device 110A according to an exemplary embodiment of the inventive concept includes a heat dissipating sheet 111, a magnetic sheet 112, and a protection cover 113. The first antenna device 110A has a vertically stacked structure. For example, when the first antenna device 110A is formed in a portable terminal, the first antenna device 110A can be mounted on a back cover BC of the portable terminal to face the inside of the portable terminal. The heat dissipating sheet 111 can be stacked on the back cover BC of the portable terminal by an adhesive tape 115a. Furthermore, the back cover BC may be detachable from the portable terminal.

According to an embodiment, the heat dissipating sheet 111 includes a pattern for detecting a surrounding magnetic flux and transceiving a wireless signal. Therefore, the heat dissipating sheet 111 can generate a magnetic field based on a received external signal or can generate a signal in response to an externally generated magnetic field. Furthermore, the heat dissipating sheet 111 can absorb heat generated around the heat dissipating sheet 111 and emit the heat to a lower temperature region, i.e. a region with a temperature lower than that of the heat dissipating sheet. For example, when the first antenna device 110A is formed in a portable terminal, the heat dissipating sheet 111 absorbs heat generated by the portable terminal and emits the absorbed heat to a lower temperature region in the portable terminal. Moreover, for example, the heat dissipating sheet 111 according to an exemplary embodiment of the inventive concept may include natural graphite particles, compressed exfoliated graphite particles, artificial graphite particles, copper, or at least one of a graphene particle, a carbon nanotube (CNT), and a graphene hybrid.

According to an embodiment, the magnetic sheet 112 is stacked on an upper surface of the heat dissipating sheet 111 and shields the heat dissipating sheet 111 by interfering with the performance of a pattern included in the heat dissipating sheet 111 that acts as an antenna. For example, the magnetic sheet 112 can be adhered to the upper surface of the heat dissipating sheet 111 by an adhesive tape 115b. The magnetic sheet 112 is made of ferrite and has a thickness of about 0.1 mm, and is stacked by being manufactured as a ferrite sheet. According to an embodiment, the protection cover 113 is an outermost contour protection member stacked on an upper surface of the magnetic sheet 112 by an adhesive tape 115c. However, a configuration of stacking the magnetic sheet 112 on the upper surface of the heat dissipating sheet 111 and stacking the protection cover 113 on the upper surface of the magnetic sheet 112 is only an example, and exemplary embodiments are not limited thereto. The protection cover 113 or the magnetic sheet 112 without the protection cover 113 may be stacked on the upper surface of the heat dissipating sheet 111. Furthermore, the first antenna device 110A may be configured as the heat dissipating sheet 111 without stacking the magnetic sheet 112 on the heat dissipating sheet 111.

By forming a first antenna device 110A that includes the heat dissipating sheet 111 with a pattern for detecting a surrounding magnetic flux and transceiving a wireless signal in a communication device such as a portable terminal, heat dissipation efficiency of heat generated by a communication device can be improved, and thus wireless communication quality with other portable terminals can also be improved.

Figure 3:
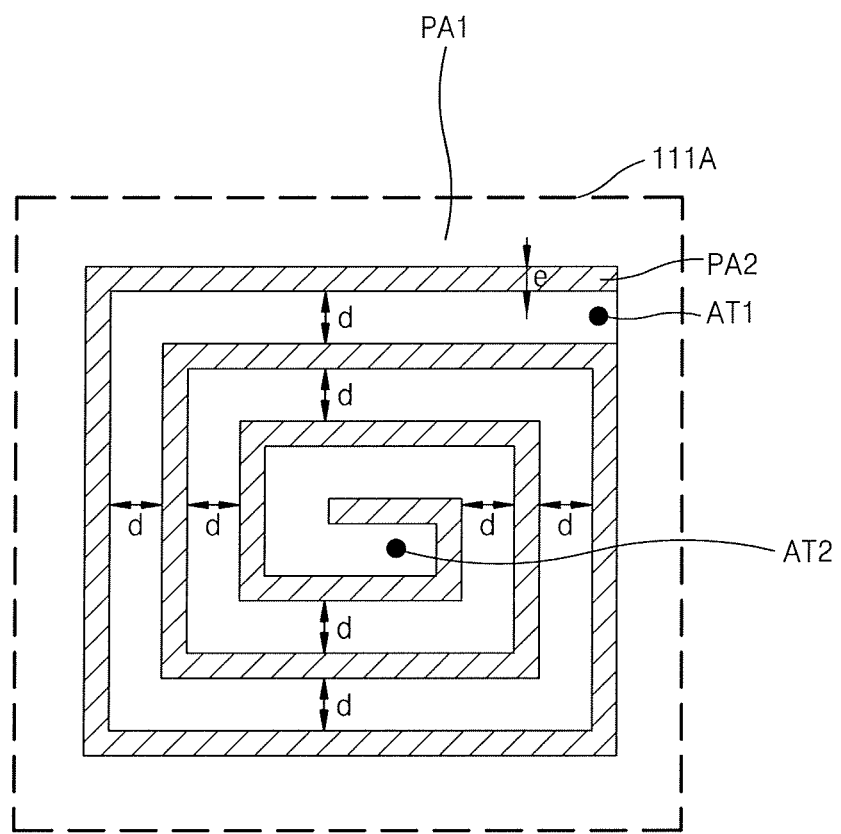
FIG. 3 shows a heat dissipating sheet that includes a pattern according to an exemplary embodiment of the inventive concept.

FIG. 3 shows a heat dissipating sheet 111A that includes a pattern according to an exemplary embodiment of the inventive concept.

Referring to FIG. 3, the heat dissipating sheet 111A may include natural graphite particles, compressed exfoliated graphite particles, artificial graphite particles, copper, or at least one of a graphene particle, a CNT, and a graphene hybrid. The heat dissipating sheet 111A has a thickness of about 50 μm or less and a thermal conductivity of about 1000W/mk or more. Furthermore, the heat dissipating sheet 111A can be manufactured by baking and compressing graphite at a high temperature of 3000° C. or more. The heat dissipating sheet 111A manufactured as above may be conductive.

According to an embodiment, the heat dissipating sheet 111A includes a pattern PA1 in the heat dissipating sheet 111A for detecting a surrounding magnetic flux and transceiving a wireless signal. A patterning operation that removes a removal area PA2 from the heat dissipating sheet 111A is performed to form the pattern PA1.

According to an embodiment, the removal area PA2 has a constant width e throughout the removal area PA2. Furthermore, the patterning operation can be performed by setting intervals between the removal area PA2 so that the pattern PA1 has a constant width d. The pattern PA1 is formed in a loop shape with intervals of constant width e due to the removal area PA2 by performing the patterning operation. However, the shape of the pattern PA1 as illustrated in FIG. 3 is not limited thereto, and the pattern PA1 may have a circular rolled up shape. Furthermore, various types of patterns PA1 may be formed by varying the width e of the removal area PA2 or the width d of the pattern PA1.

Furthermore, the heat dissipating sheet 111A includes first and second connection terminals AT1 and AT2 respectively located at one end and the other end of the pattern PA1. At least one of the first and second connection terminals AT1 and AT2 can be electrically connected to at least one of the first and second terminals 101 and 102 illustrated in FIG. 1.

Figure 4:
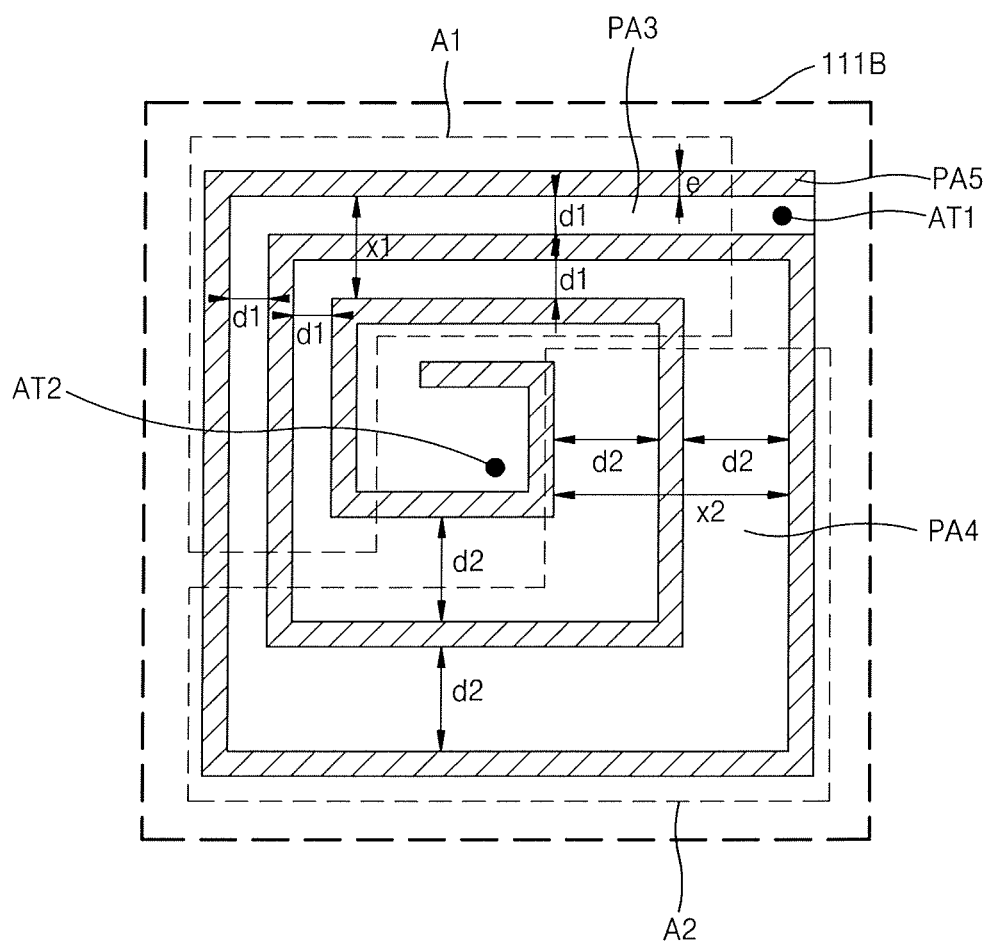
FIG. 4 shows a heat dissipating sheet that includes a pattern according to another exemplary embodiment of the inventive concept.

FIG. 4 shows a heat dissipating sheet 111B that includes a pattern according to another exemplary embodiment of the inventive concept.

Referring to FIG. 4, a pattern PA3 included in a heat dissipating sheet 111B can be differentiated from the pattern PA1 included in the heat dissipating sheet 111A illustrated in FIG. 3. For example, the heat dissipating sheet 111B includes first and second areas A1 and A2. A first pattern PA3 can be formed in the first area A1 and a second pattern PA4 can be formed in the second area A2. Therefore, the heat dissipating sheet 111B includes the first and second patterns PA3 and PA4. Furthermore, a width d1 of the first pattern PA3 is narrower than a width d2 of the second pattern PA4, while a width e of a removal area PA5 is constant throughout the whole removal area PA5. Therefore, a width X1 occupied by two adjacent patterns in the first pattern PA3 is be narrower than a width X2 occupied by two adjacent patterns in the second pattern PA4 and the first pattern PA3 is more dense than the second pattern PA4.

However, the exemplary embodiment of FIG. 3 is not limited thereto, and the first pattern PA3 can be have a higher density than the second pattern PA4 by narrowing a width of the removal area PA5 in the first area A1 and enlarging a width of the removal area PA5 in the second area A2.

Furthermore, other methods can be used to form the first and second patterns PA3 and PA4 with higher densities. By forming the first pattern PA3 of the heat dissipating sheet 111B with a higher density than the second pattern PA4, the magnitude of magnetic flux detected through the first pattern PA3 in the first area A1 may be greater than the magnitude of magnetic flux detected through the second pattern PA4 in the second area A2.

Furthermore, the heat dissipating sheet 111B includes first and second connection terminals AT1 and AT2 respectively located at one end and the other end of the pattern that includes the first and second patterns PA3 and PA4. At least one of the first and second connection terminals AT1 and AT2 can be electrically connected to at least one of the first and second terminals 101 and 102 illustrated in FIG. 1.

Figure 5:
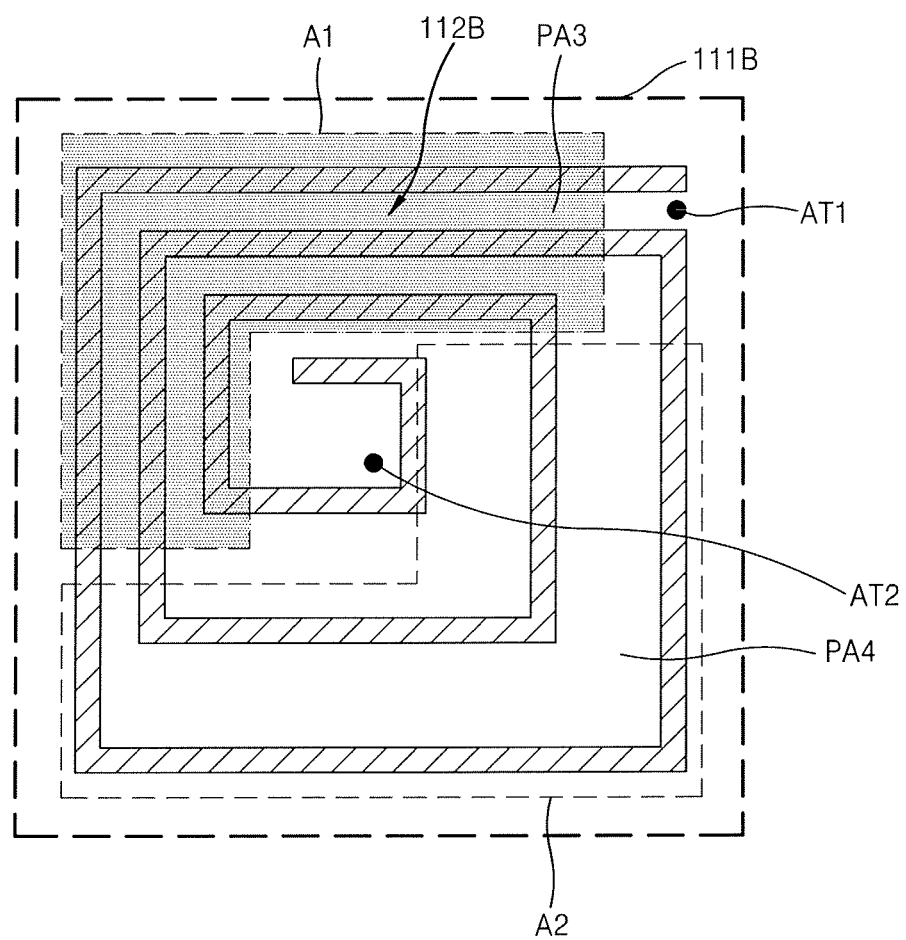
FIG. 5 shows a heat dissipating sheet on which a partial magnetic sheet is stacked according to an exemplary embodiment of the inventive concept.

FIG. 5 shows a heat dissipating sheet 111B on which a partial magnetic sheet 112B is stacked according to an exemplary embodiment of the inventive concept.

FIG. 5 illustrates the same heat dissipating sheet 111B as illustrated in FIG. 4, in which the first pattern PA3 acts as an antenna. The magnitude of magnetic flux detected through the first pattern PA3 in the first area A1 may be greater than the magnitude of the magnetic flux detected through the second pattern PA4 in the second area A2, since, as described above, the first pattern PA3 of the first area A1 has a higher density than the second pattern PA4 of the second area A2. The heat dissipating sheet 111B may be affected by environmental factors that interfere with the performance of the first pattern PA3, as the magnitude of magnetic flux detected through the first pattern PA3 in the first area A1 is greater than the magnitude of magnetic flux detected through the second pattern PA4 in the second area A2. To avoid this, for example, a partial magnetic sheet 112B is stacked on an upper surface of the first area A1 of the heat dissipating sheet 111 B to cover the first pattern PA3, and thus shields the heat dissipating sheet 111B from environmental factors that can interfere with the performance of the first pattern PA3. However, the configuration of FIG. 5 is not limited thereto, and the partial magnetic sheet 112B may be stacked on a portion of the first area A1, or may be stacked on the entire area of the heat dissipating sheet 111B. In addition, the partial magnetic sheet 112B may be stacked on an upper surface of the second area A2.

Figure 6:
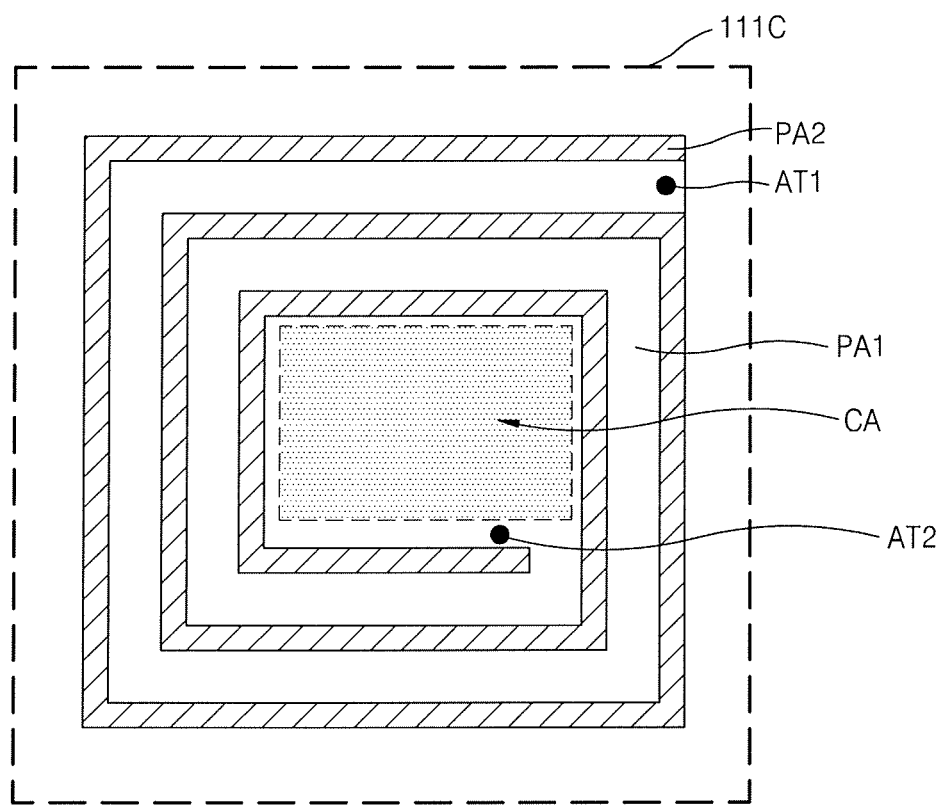
FIG. 6 shows a heat dissipating sheet on which a pattern is formed according to another exemplary embodiment of the inventive concept.

FIG. 6 shows a heat dissipating sheet 111C on which a pattern PA1 is formed according to another exemplary embodiment of the inventive concept.

Referring to FIG. 6, the pattern PA1 formed in the heat dissipating sheet 111C can be differentiated from that illustrated in FIG. 3. For example, the heat dissipating sheet 111C illustrated in FIG. 6 includes a center area CA. According to an embodiment, the center area CA corresponds to a reference width to improve the heat dissipating operation of the heat dissipating sheet 111C. The pattern PA1 can be formed by removing the removal area PA2 around a contour of the center area CA. The pattern PA1 can include the first and second connection terminals AT1 and AT2. The reference width is set before performing the patterning operation on the heat dissipating sheet 111C.

Figure 7:
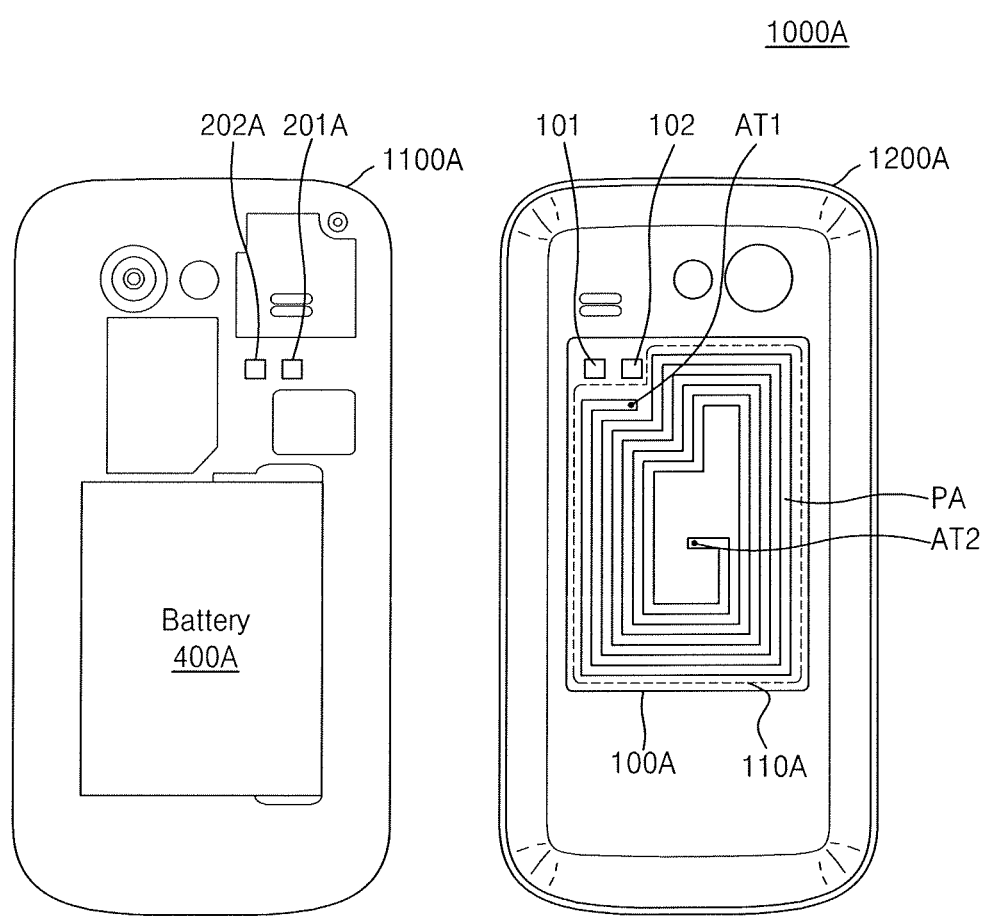
FIG. 7 shows an embodiment of an antenna module installed in a portable terminal according to an exemplary embodiment of the inventive concept.

FIG. 7 shows an embodiment of an antenna module 100A installed in a portable terminal 1000A according to an exemplary embodiment of the inventive concept.

Referring to FIGS. 1 and 7, the wireless communication module 10A can be included in the portable terminal 1000A. The portable terminal 1000A can transceive voice data, video data, or an address book with other portable devices through the wireless communication module 10A. Furthermore, an owner of the portable terminal 1000A can pay for goods or service through the wireless communication module 10A and use the wireless communication module 10A as an identification means.

As illustrated in FIG. 7, the portable terminal 1000A can be separated into a main body 1100A and a back cover 1200A. According to an embodiment, the main body 1100A includes a battery 400A and a board in which the matching circuit 200 and the controller 300 illustrated in FIG. 1 are installed. Furthermore, according to an embodiment, the main body 1100A includes exposed terminals 201A and 202A that connect the matching circuit 200 and the antenna module 100A to each other.

According to an embodiment, as illustrated in FIG. 7, the antenna module 100A can be mounted on an inner surface of the back cover 1200A. The antenna module 100A includes a first antenna device 110A, a first terminal 101, and a second terminal 102. The first and second terminals 101 and 102 are exposed and electrically connected to the terminals 201 A and 202A of the main body 1100A, respectively, and may be respectively electrically connected to the terminals 201A and 202A when the back cover 1200A is coupled to the main body 1100A. That is, the antenna module 100A is detachable from the matching circuit 200 in a present exemplary embodiment.

According to an embodiment, the first antenna device 110A includes a heat dissipating sheet with a pattern PA that can detect a surrounding magnetic flux and transceive a wireless signal. As the first antenna device 110A is disposed on the inner surface of the back cover 1200A, the first antenna device 110A may effectively dissipate heat by absorbing heat generated by the portable terminal 1000A and emitting the heat to a lower temperature region, and can function as an antenna for transceiving a wireless signal.

Furthermore, for example, the first and second terminals 101 and 102 of the antenna module 100A can be respectively connected to the first and second connection terminals AT1 and AT2 of the heat dissipating sheet. Therefore, the first and second connection terminals AT1 and AT2 can be respectively electrically connected to the terminals 201A and 202A of the main body 1100A when the first and second terminals 101 and 102 are respectively electrically connected the terminals 201A and 202A. It is possible to transmit the wireless signal detected by the first antenna device 110A to the main body 1100A in which the matching circuit 200 and the controller 300 illustrated in FIG. 1 are installed through the first and second connection terminals AT1 and AT2. Although FIG. 7 illustrates only a heat dissipating sheet for convenience of illustration, the first antenna device 110A may include a magnetic sheet or a protection cover as described with reference to FIGS. 2A and 2B.

In another exemplary embodiment, the wireless communication module 10A is an NFC module. Wireless communication through the NFC module can be performed when a distance is 10 cm or less and a distance between antennas communicating with each other is 10 cm or less. As illustrated in FIG. 7, the antenna module 100A can be installed on an inner surface of the back cover 1200A of the portable terminal 1000A. The user can perform wireless communication through the NFC module by contacting or bringing the NFC module close to a back surface of the portable terminal 1000A, in which the main body 1100A and the back cover 1200A are coupled, or to a communication device supporting another NFC module.

Figure 8:
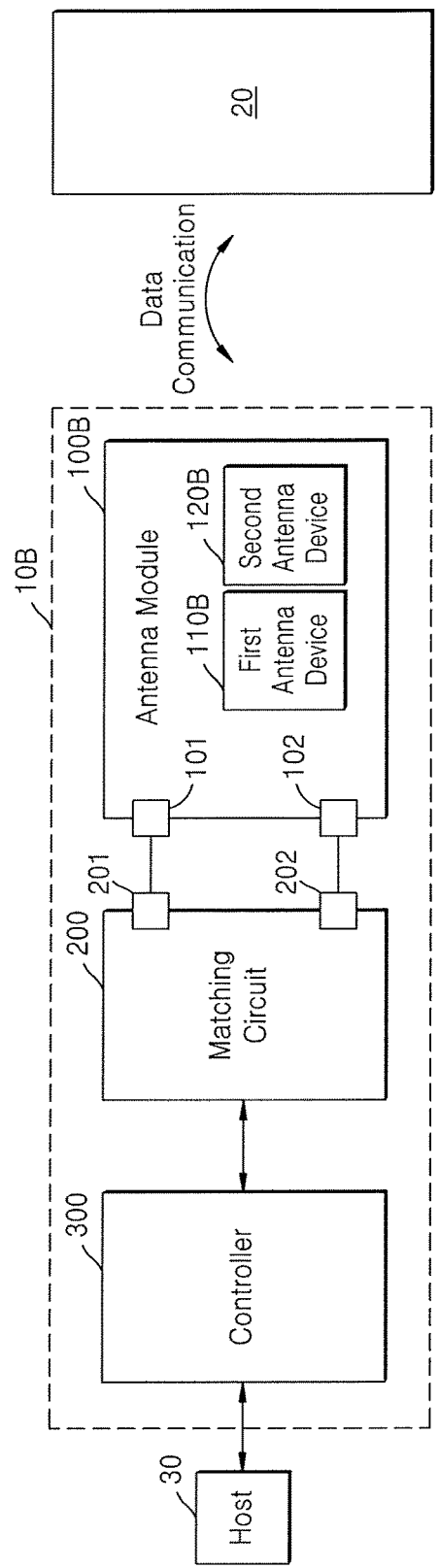
FIG. 8 is a block diagram of a wireless communication module according to another exemplary embodiment of the inventive concept.

FIG. 8 is a block diagram of a wireless communication module 10B according to another exemplary embodiment of the inventive concept.

According to an embodiment, referring to FIG. 8, the wireless communication module 10B includes an antenna module 100B, a matching circuit 200, and a controller 300. The antenna module 100B includes first and second antenna devices 110B and 120B, and other elements of FIG. 8 correspond to those of the wireless communication module 10A of FIG. 1.

According to an embodiment, the antenna module 100B includes the first and second antenna devices 110B and 120B and can generate a magnetic field based on a received signal or can generate a signal in response to an externally generated magnetic field. The first antenna device 110B includes a heat dissipating sheet with a pattern that can detect a surrounding magnetic flux and transceive a wireless signal. Furthermore, the heat dissipating sheet can absorb heat generated from the wireless communication module 10B or an adjacent device and emit the heat to a lower temperature region.

According to an embodiment, the second antenna device 120B includes a flexible printed circuit board (FPCB) that includes an antenna pattern that detects a surrounding magnetic flux and transceives a wireless signal. For example, an antenna pattern of the second antenna device 120B can be formed on the FPCB. The antenna pattern of the second antenna device 120B can be formed by coating an insulating film on the FPCB, forming an antenna pattern in a loop shape by printing a conductive paste on one surface of the insulating film, and forming a plating layer on a surface of the printed and dried antenna pattern. The FPCB on which the antenna pattern of the second antenna device 120B is formed can be connected to at least one of the first and second terminals 101 and 102 and thus connected to the matching circuit 200. Therefore, the second antenna device 120B can be used to complement the first antenna device 110B with the patterned heat dissipating sheet that acts as an antenna.

Figure 9:
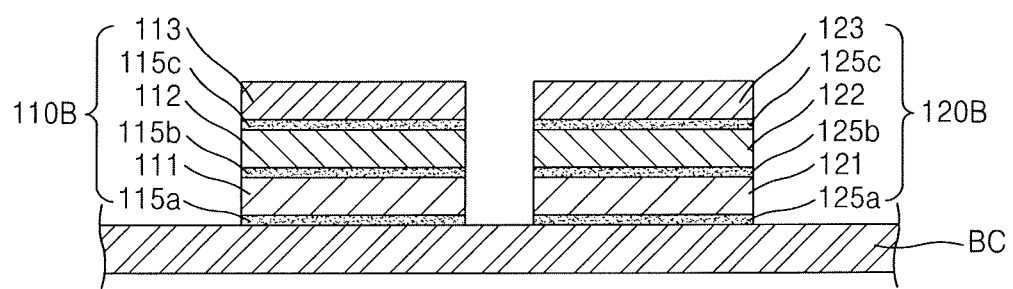
FIG. 9 is an enlarged sectional view of first and second antenna devices of FIG. 8.

FIG. 9 is an enlarged sectional view of the first and second antenna devices 110B and 120B of FIG. 8.

According to an embodiment, referring to FIG. 9, the first antenna device 110B corresponds to the first antenna device 110A of FIG. 2B. The second antenna device 120B is adjacent to the first antenna device 110B. The second antenna device 120B includes an FPCB 121, a magnetic sheet 122, and a protection cover 123. The first and second antenna devices 110B and 120B have a vertically stacked structure. For example, when the first and second antenna devices 110B and 120B are formed in a portable terminal, the first and second antenna devices 110B and 120B can be mounted on a detachable back cover BC of the portable terminal to face the inside of the portable terminal. The FPCB 121 can be stacked on the back cover BC of the portable terminal by an adhesive tape 125a.

According to an embodiment, the FPCB 121 includes an antenna pattern that can detect a surrounding magnetic flux and transceive a wireless signal. Therefore, the FPCB 121 can generate a magnetic field based on an external signal received through the antenna pattern or generate a signal in response to an externally generated magnetic field. The magnetic sheet 122 is stacked on an upper surface of the FPCB 121 and shields the FPCB 121 from environmental factors than can interfere with the performance of the antenna pattern in the FPCB 121. For example, the magnetic sheet 122 can be stacked on the FPCB 121 by an adhesive tape 125b. The magnetic sheet 122 is made of ferrite and has a thickness of about 0.1 mm, and can be stacked on the FPCB 121 by being manufactured as a ferrite sheet. The protection cover 123 is an outermost contour protection member adhered on an upper surface of the magnetic sheet 122 by an adhesive tape 125c.

However, a configuration of stacking the magnetic sheet 122 on the upper surface of the FPCB 121 and stacking the protection cover 123 on the upper surface of the magnetic sheet 122 is only an example, and exemplary embodiments are not limited thereto. The protection cover 123 or the magnetic sheet 122 may be stacked on the upper surface of the FPCB 121. Furthermore, the second antenna device 120B may be configured by the FPCB 121 without stacking the magnetic sheet 122 on the FPCB 121.

By forming the first antenna device 110B in a communication device such as a portable terminal to include a heat dissipating sheet 111 with a pattern that can detect a surrounding magnetic flux and transceive a wireless signal, and the second antenna device 120B to complement antenna performance of the first antenna device 110B, heat dissipation efficiency of heat generated by the communication device can be improved and thus wireless communication quality with other portable terminals can also be improved.

Figure 10:
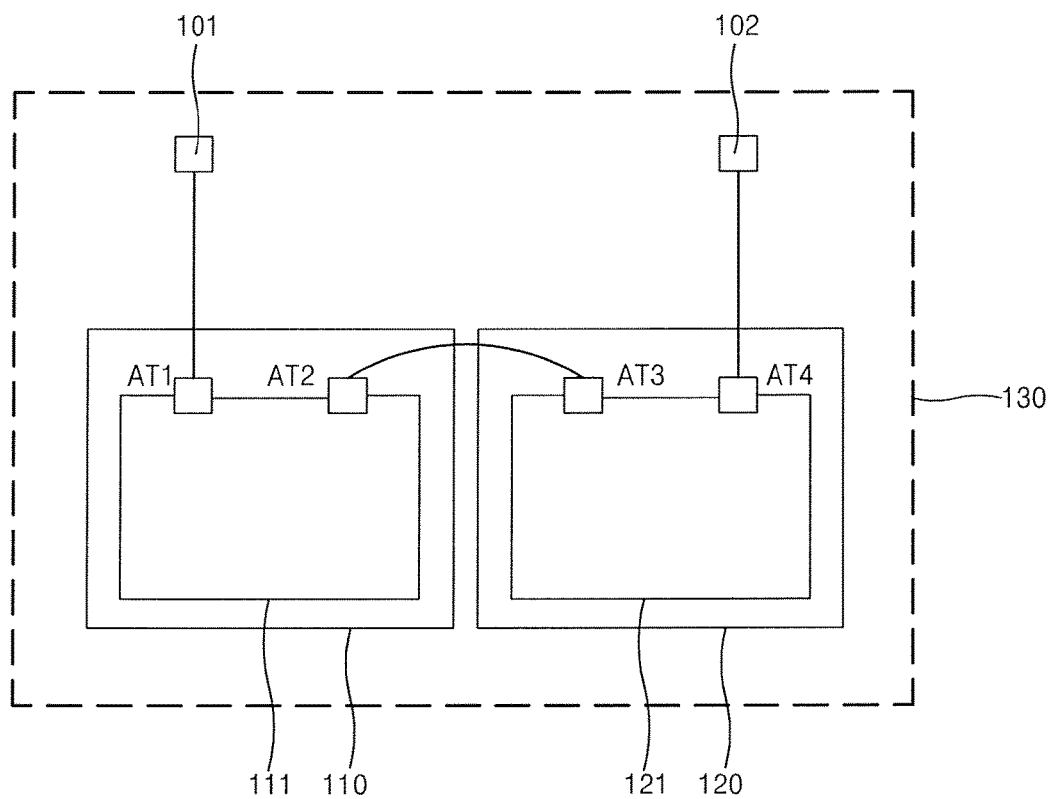
FIG. 10 is a block diagram that illustrate a connection relation among connection terminals of a heat dissipating sheet of a first semiconductor device, connection terminals of a flexible printed circuit board (FPCB) of a second semiconductor device, and terminals included in an antenna module.

FIG. 10 is a block diagram that illustrates a connection relation among first and second connection terminals AT1 and AT2 of a heat dissipating sheet 111 of a first semiconductor device, third and fourth connection terminals AT3 and AT4 of an FPCB 121 of a second semiconductor device, and first and second terminals 101 and 102 included in an antenna module 100.

According to an embodiment, referring to FIG. 10, the antenna module 100 includes a first antenna device 110, a second antenna device 120, and first and second terminals 101 and 102. The first antenna device 110 includes the patterned heat dissipating sheet 111 and the second antenna device 120 includes the FPCB 121 with an antenna pattern. The heat dissipating sheet 111 includes the first and second connection terminals AT1 and AT2 and the FPCB 121 includes the third and fourth connection terminals AT3 and AT4. The first connection terminal AT1 can be connected to the first terminal 101, the fourth connection terminal AT4 can be connected to the second terminal 102, and the second connection terminal AT2 can be connected to the third connection terminal AT3. Accordingly, the first and second antenna devices 110 and 120 can complementarily detect a surrounding magnetic flux and may transmit a signal generated based on the detected magnetic flux to the matching circuit 200 of FIG. 1 through the first and second terminals 101 and 102. However, the configuration is an example and exemplary embodiments are not limited thereto, and connections between the first and second connection terminals AT1 and AT2, the third and fourth connection terminals AT3 and AT4, and the first and second terminals 101 and 102 may vary.

Figure 11:
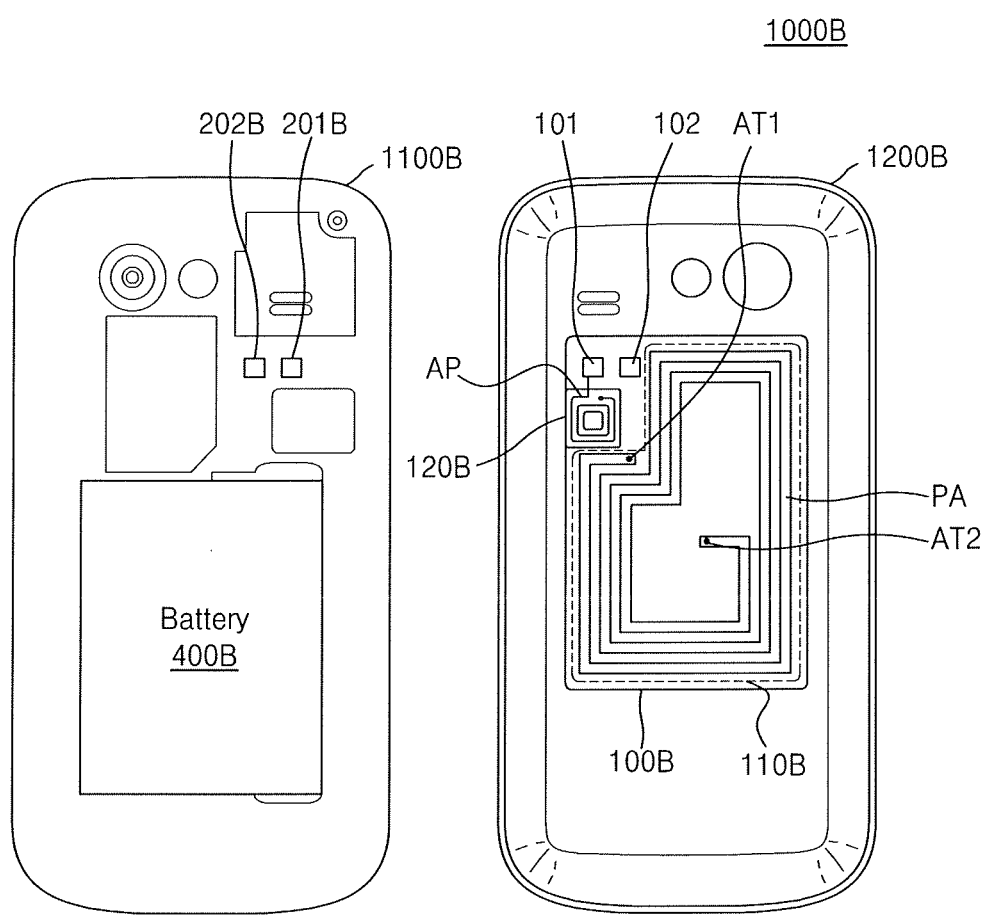
FIG. 11 shows an embodiment of an antenna module installed in a portable terminal according to another exemplary embodiment of the inventive concept.

FIG. 11 shows an embodiment of an antenna module 100B installed in a portable terminal 1000B according to another exemplary embodiment of the inventive concept.

According to an embodiment, referring to FIGS. 1 and 11, the antenna module 100B is installed on an inner surface of the back cover 1200B. The antenna module 100B includes a first antenna device 110B, a second antenna device 120B, a first terminal 101, and a second terminal 102.

According to an embodiment, the first antenna device 110B is disposed in a predetermined area of the inner surface of the back cover 1200B and the second antenna device 120B is disposed in a remaining area of the inner surface of the back cover 1200B. The first antenna device 110B includes a heat dissipating sheet having a pattern PA that can detect a surrounding magnetic flux and transceive a wireless signal as described above. The second antenna device 120B includes an FPCB with an antenna pattern AP. As described with reference to FIG. 10, first and second connection terminals AT1 and AT2 included in the heat dissipating sheet can be respectively connected to any one of connection terminals of the FPCB and any one of terminals 101B and 102B of the second antenna device 120B. The predetermined area on the inner surface of the back cover 1200B may be larger than the remaining area on the inner surface of the back cover 1200B.

Although FIG. 11 illustrates a heat dissipating sheet in the first antenna device 110E and an FPCB in the second antenna device 120B for convenience of illustration, the first and second antenna devices 110B and 120B may include a magnetic sheet or a protection cover as described with reference to FIGS. 2A and 2B, and FIG. 9.

Figure 12:
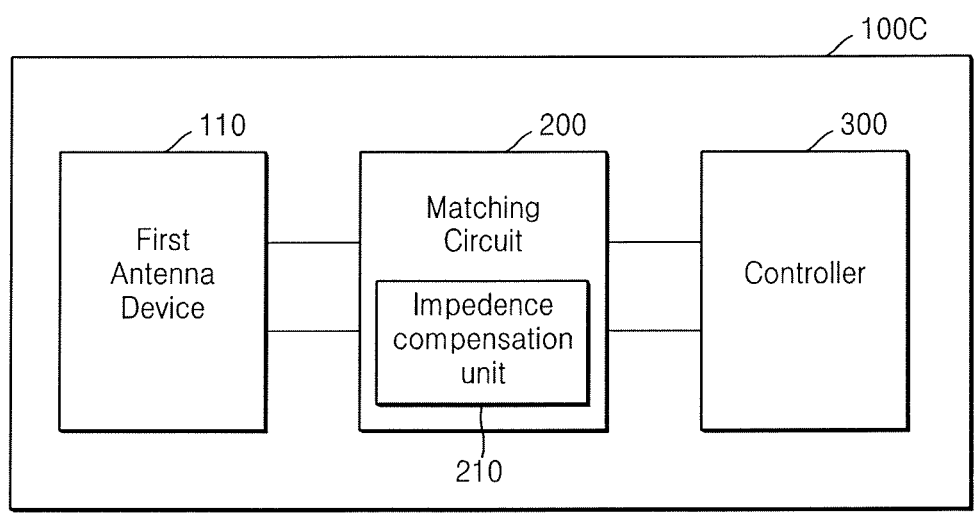
FIG. 12 shows an embodiment of an antenna module according to an exemplary embodiment of the inventive concept.

FIG. 12 shows an embodiment of an antenna module 100C according to an exemplary embodiment of the inventive concept.

According to an embodiment, referring to FIG. 12, the antenna module 100C includes a first antenna device 110, a matching circuit 200, and a controller 300. The controller 300 controls wireless communication or NFC and the matching circuit 200 matches impedance between the first antenna device 110 and the controller 300. The controller 300 controls the first antenna device 110 that transceiver wireless signals for wireless communication. The matching circuit 200 includes an impedance compensation unit 210. The impedance compensation unit 210 can compensate the impedance of the first antenna device 110 for accurate impedance matching between the controller 300 and the first antenna device 110. That is, the impedance compensation unit 210 can compensate for the impedance of a pattern formed in a heat dissipation sheet in the first antenna device 110. For example, the impedance compensation unit 210 may include a passive element such as a capacitor or an inductor.

Figure 13:
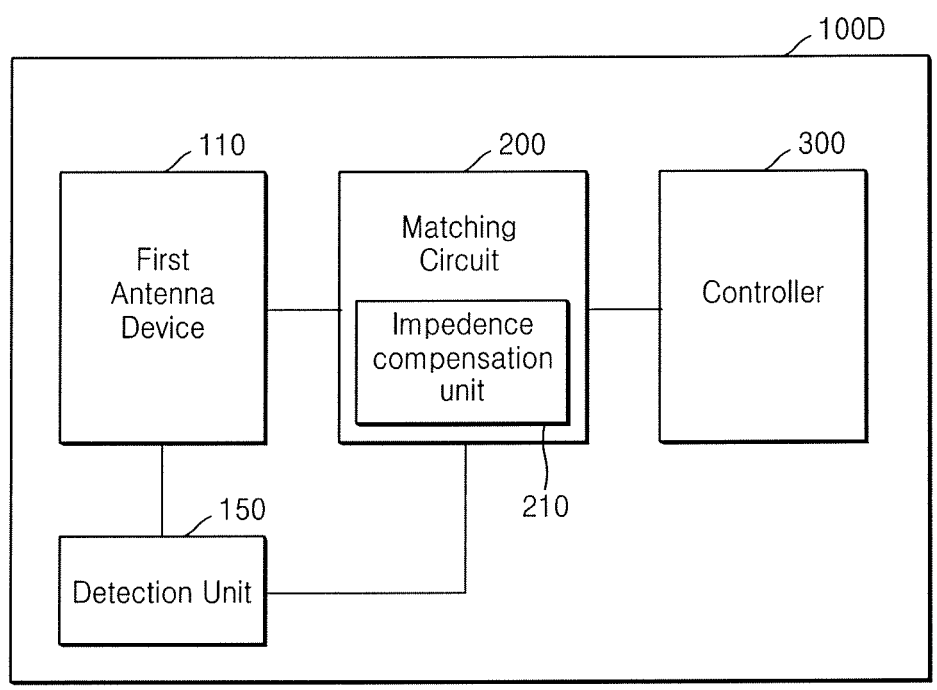
FIG. 13 shows an embodiment of an antenna module according to another exemplary embodiment of the inventive concept.

FIG. 13 shows an embodiment of an antenna module 100D according to another exemplary embodiment of the inventive concept.

According to an embodiment, referring to FIG. 13, the antenna module 100D includes a first antenna device 110, a matching circuit 200, a controller 300, and a detection unit 150. As compared to the antenna module 100C of FIG. 12, the antenna module 100D further includes the detection unit 150.

According to an embodiment, the impedance compensation unit 210 includes a variable capacitor to adjust impedance for compensating the first antenna device 110. The detection unit 150 can adjust an impedance state of a pattern in a heat dissipating sheet in the first antenna device 110. The impedance compensation unit 210 can adjust a magnitude of the impedance to compensate the first antenna device 110 based on the impedance state detected by the detection unit 150. For example, the detection unit 150 can detect a reference voltage of a carrier signal transceived by the first antenna device 110 by detecting an impedance state. The impedance compensation unit 210 can adjust the impedance to compensate the first antenna device 110 based on the detected reference voltage. In an exemplary embodiment, the impedance compensation unit 210 compensates the impedance of the first antenna device 110 to change the reference voltage to a predetermined reference value, unless the reference voltage already corresponds to the predetermined reference value.

Figure 14:
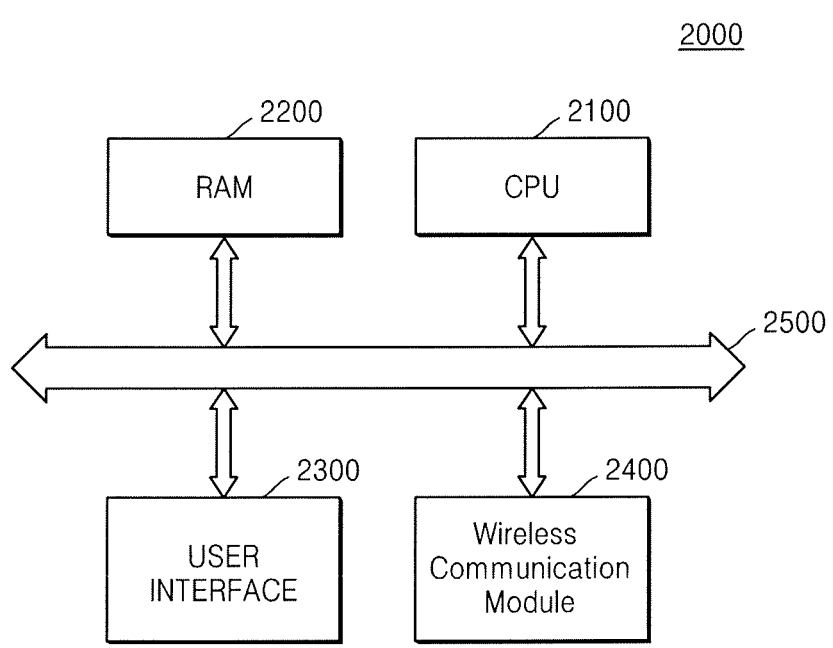
FIG. 14 is a block diagram of a computing system including a wireless communication module according to an exemplary embodiment of the inventive concept.

FIG. 14 is a block diagram of a computing system 2000 that includes a wireless communication module 2400 according to an exemplary embodiment of the inventive concept.

The wireless communication module 2400 according to an exemplary embodiment of the inventive concept can be installed in a computing system 2000, such as a mobile device, a desktop computer or a server. The computing system 2000 according to an exemplary embodiment of the inventive concept includes a central processing unit (CPU) 2100, a random access memory (RAM) 2200, a user interface 2300, and the wireless communication module 2400, and the components can be electrically respectively connected via a bus 2500.

According to an embodiment, the CPU 2100 controls the computing system 2000 and can transmit data out of the computing system 2000 through the wireless communication module 2400 via the bus 2500. The RAM 2200 functions as a data memory of the CPU 2100 and may include, for example, dynamic random access memory (DRAM). The user interface 2300 receives command from a user of the computing system 2000 or outputs a signal, such as voice or video data, to the user.

According to an embodiment, the wireless communication module 2400 includes an antenna module, a matching circuit, and a controller as the exemplary embodiments described above. The antenna module may correspond to the antenna modules described with reference to FIGS. 1 to 11, and the matching circuit can be connected to first and second terminals of the antenna module and be connected to the controller. The matching circuit can change impedance between the antenna module and the controller and transmit a signal. The controller can transceive data through the bus 2500. The controller may encode and/or modulate the data received through the bus 2500 and may demodulate and/or decode the signal received from the matching circuit.

While embodiments of the inventive concept has been particularly shown and described with reference to exemplary embodiments thereof, it will be understood that various changes in form and details may be made therein without departing from the spirit and scope of the following claims.

What is claimed is:

1. A wireless communication module, comprising:
    a controller configured to control wireless communication operations;
    an antenna module that includes a first antenna device; and
    a matching circuit configured to perform impedance matching between the controller and the antenna module wherein
    the first antenna device includes a heat dissipating sheet with a first pattern that transceives wireless signals by detecting a surrounding magnetic flux.

2. The wireless communication module of claim 1, wherein the heat dissipating sheet comprises at least one of natural graphite particles, compressed exfoliated graphite particles, copper, graphene particles, carbon nanotubes (CNT), and a graphene hybrid.

3. The wireless communication module of claim 1, wherein
    the heat dissipating sheet comprises a near field communication (NFC) antenna, and
    the controller comprises an NFC chip that controls near field communication.

4. The wireless communication module of claim 1, wherein the first antenna device further comprises a magnetic sheet stacked on an upper surface of the heat dissipating sheet and that covers the first pattern in the heat dissipating sheet.

5. The wireless communication module of claim 4, wherein the magnetic sheet comprises a ferrite sheet.

6. The wireless communication module of claim 1, wherein
the heat dissipating sheet comprises a second pattern, and
a pattern width of the first pattern is narrower than that of the second pattern.

7. The wireless communication module of claim 1, further comprising an impedance compensation unit configured to compensate impedance in the pattern in the heat dissipating sheet.

8. The wireless communication module of claim 7, further comprising a detection unit configured to detect an impedance state of the pattern in the heat dissipating sheet, wherein
the impedance compensation unit adjusts a magnitude of the impedance based on the impedance state detected by the detection unit.

9. The wireless communication module of claim 1, wherein
the antenna module comprises a second antenna device, and
the second antenna device comprises:
a flexible printed circuit board (FPCB); and
a pattern in the FPCB and configured to detect a surrounding magnetic flux and transceive a wireless signal.

10. The wireless communication module of claim 9, wherein
the second antenna device further comprises a magnetic sheet stacked on one surface of the FPCB and that covers the pattern in the FPCB.

11. A portable terminal comprising:
a cover; and
an antenna device mounted on an inner surface of the cover, wherein
the antenna device comprises:
a heat dissipating sheet that emits heat to a lower temperature region wherein the heat dissipating sheet includes a pattern that detects a surrounding magnetic flux and transceiver a wireless signal; and
a magnetic sheet stacked on one surface of the heat dissipating sheet and that covers a pattern in the heat dissipating sheet.

12. The portable terminal of claim 11, further comprising:
a flexible printed circuit board (FPCB) on which a plurality of semiconductor chips are mounted;
a connection terminal connected to at least one of one end and an other end of the pattern on the heat dissipating sheet; and
a main body terminal connected to the FPCB, wherein
the connection terminal is connected to the main body terminal.

13. The portable terminal of claim 11, wherein
the antenna device further comprises a protection cover stacked on one surface of the heat dissipating sheet.

14. The portable terminal of claim 11, wherein
the pattern formed in the heat dissipating sheet comprises first and second patterns, and
pattern intervals of the first and second patterns differ from each other.

15. A wireless communication module, comprising:
an antenna module that includes a first antenna device,
wherein the first antenna device includes a heat dissipating sheet and a magnetic sheet stacked on an upper surface of the heat dissipating sheet,
wherein the heat dissipating sheet includes a first pattern for transceiving wireless signals by detecting a surrounding magnetic flux, and magnetic sheet covers the first pattern in the heat dissipating sheet,
wherein the heat dissipating sheet comprises at least one of natural graphite particles, compressed exfoliated graphite particles, copper, graphene particles, carbon nanotubes (CNT), and a graphene hybrid, and the magnetic sheet comprises a ferrite sheet.

16. The wireless communication module of claim 15, wherein the heat dissipating sheet comprises a second pattern, and pattern intervals of the first and second patterns differ from each other.

17. The wireless communication module of claim 15, further comprising
a controller configured to control wireless communication operations; and
a matching circuit configured to perform impedance matching between the controller and the antenna module.

18. The wireless communication module of claim 17, further comprising:
an impedance compensation unit configured to compensate impedance in the pattern of the heat dissipating sheet.

19. The wireless communication module of claim 18, further comprising:
a detection unit configured to detect an impedance state of the pattern in the heat dissipating sheet, wherein
the impedance compensation unit adjusts a magnitude of the impedance based on the impedance state detected by the detection unit.

20. The wireless communication module of claim 15, wherein
the antenna module comprises a second antenna device, and
the second antenna device comprises:
a flexible printed circuit board (FPCB); and
a pattern in the FPC that is configured to detect a surrounding magnetic flux and transceive a wireless signal,
wherein the second antenna device further comprises a magnetic sheet stacked on one surface of the FPCB and that covers the pattern in the FPCB.

* * * * *